(12) United States Patent
Fujiwara (10) Patent No.: US 6,181,494 B1
(45) Date of Patent: Jan. 30, 2001

(54) RECORDING FORMAT FOR AUTOMATIC ADJUSTMENT, RECORDING DEVICE THEREFOR AND AUTOMATIC ADJUSTMENT DEVICE

(75) Inventor: Mikio Fujiwara, Hirakata (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/202,012
(22) PCT Filed: Apr. 7, 1998
(86) PCT No.: PCT/JP98/01591
  § 371 Date: Dec. 8, 1998
  § 102(e) Date: Dec. 8, 1998
(87) PCT Pub. No.: WO98/45836
  PCT Pub. Date: Oct. 15, 1998

(30) Foreign Application Priority Data

Apr. 8, 1997 (JP) .................................................. 9-089135

(51) Int. Cl.[7] .................................................... G11B 5/09
(52) U.S. Cl. ............................................ 360/46; 360/39
(58) Field of Search .................................. 369/47, 48, 49, 369/50, 54, 58, 59; 360/32, 39, 46, 48, 51, 53

(56) References Cited

U.S. PATENT DOCUMENTS

| 5,077,623 | 12/1991 | McSweeney . |
| 5,107,483 | * 4/1992 | Nakajima et al. ................. 369/108 |
| 5,858,045 | * 12/1998 | Kirino et al. .................... 369/59 X |
| 6,091,684 | * 7/2000 | Schell ............................. 369/50 |

FOREIGN PATENT DOCUMENTS

| 639 826 | 2/1995 | (EP) . |
| 58-66073 | 4/1983 | (JP) . |
| 1-112508 | 5/1989 | (JP) . |
| 2-256391 | 10/1990 | (JP) . |
| 5-144123 | 6/1993 | (JP) . |

OTHER PUBLICATIONS

European Search Report dated Nov. 26, 1999, application No. 98911226.
Japanese language search report for Int'l Appln No. PCT/JP98/01591 dated Jul. 7, 1998.
English language translation of Japanese language search report.

* cited by examiner

Primary Examiner—Muhammad Edun
(74) Attorney, Agent, or Firm—Ratner & Prestia (57) ABSTRACT

In order to enhance adjustment efficiencies by automatic adjustment and gain excellent interchangeability overcoming the changes in characteristics due to variations in characteristics and wear of magnetic heads and the variations in characteristics of record media in high density recording/playback equipment, the present invention discloses a recording format provided with two recording areas of sinusoidal waves of a reference wavelength for making an adjustment of a playback amplifier and a short wavelength for making an adjustment of a playback equalizer, a recording area of adjustment data for detecting errors and making an accurate adjustment of the playback equalizer and a non-data area for recording system adjustment, and further provided on part of the foregoing areas with an indication that the medium is for automatic adjustment and at the same time with identification data to indicate kinds of the medium and, if necessary, to indicate kinds of the foregoing areas and also provided with time code, if needed, and discloses recording equipment for recording this recording format on a record medium and also automatic adjustment equipment for performing automatic adjustments by the use of data of the foregoing recording format on the reference record medium.

8 Claims, 6 Drawing Sheets

RECORDING FORMAT FOR AUTOMATIC ADJUSTMENT, RECORDING DEVICE THEREFOR AND AUTOMATIC ADJUSTMENT DEVICE

This application is a U.S. National phase application of PCT international application PCT/JP98/01591.

FIELD OF THE INVENTION

The present invention relates to a recording format used to record data on a record medium for automatically adjusting a data recordingand/or reproducing equipment, recording equipment used to record the foregoing recording format on a record medium and automatic adjustment equipment used to perform automatic adjustments by the use of data of the foregoing record format.

BACKGROUND OF THE INVENTION

When a signal is recorded on a magnetic record medium by the use of a magnetic head, the process of compensating a loss caused to develop in a short wavelength region while recording is taking place in order to make recording to optimum conditions over the entire spectrum of recording wavelengths is referred to as recording equalization. Also, when a signal is reproduced from the foregoing record medium, the process of compensating a loss developed in a short wavelength region in order to optimize the overall wavelength output characteristics is referred to as playback equalization. This is usually carried out by setting up the amount of compensation in the short wavelength region against the long wavelength region. Particularly, when a digital signal is recorded/reproduced, it is known that a pulse waveform having a small amount of waveform distortion is obtainable by adjusting the overall output in the shortest wavelength corresponding to the minimum recording pulse width to about —6 dB of that in the long wavelength region since there exist no phase distortion in the system. The optimum recording/playback equalization characteristics differ according to the characteristics of a record/playback head and are changeable according the extent of head wear, and also differ according to the kinds of magnetic record media employing a variety of magnetic materials and finishing processes.

However, one of the following two systems is generally employed, one being a system, in which recording/playback equalization characteristics are permanently fixed with the conditions of usage such as performance variations between heads, degrees of head wear and magnetic record media and the like taken into consideration and the other being a system, in which settings of recording/playback equalization characteristics are switched according to the kinds of magnetic record media. As far as these settings of recording/playback equalization characteristics remain within acceptable limits, no practical problems are anticipated, but if these settings exceed acceptable limits, errors occur with resulting generation of noises in the case of video/audio applications.

In order to cope with the foregoing situation, automatic methods for setting up recording/playback equalization characteristics relative to the combination between head and magnetic medium have been devised. For example, JP Heisei 1(1989)-112508 titled "Method of Automatic Recording/Playback Equalization for Magnetic Tape Recording and Its Equipment" discloses a method for setting up by selecting the conditions for recording equalization, under which non-linear distortions in amplitude/phase are minimized and SN ratios are maximized over a required frequency range, and performing playback equalization to minimize error rates under the foregoing conditions for recording equalization after taking the steps of recording on a magnetic tape a test signal with the level thereof varied, the test signal being intended for use in recording equalization and playback equalization, thereby allowing an optimum adjustment to be made to the combination of a head used in specific equipment and a specific magnetic tape. However, when a magnetic tape thus recorded with signals is reproduced with the use of other equipment, the combination between the head characteristics of the equipment used in recording and the magnetic tape characteristics is made in such a way as the combination is made between each respective end of the limits of variation and also the adjustment condition of the playback equipment shows a reversed combination, error rates increase due to a big difference between the recording characteristics and the playback characteristics, resulting in a failure in practical use. Further, among the foregoing methods is found a method, whereby, in consideration of the foregoing interchangeable playback, a test signal is prerecorded in the vertical blanking period in addition to the ordinary picture signal and playback equalization is performed by utilizing the test signal.

However, even if the countermeasure as described in the above is taken, the foregoing amount of playback equalization as determined according to the test signal may be exceeding the limits of adjustment in playback equalization on the part of playback equipment, depending on a combination between the recording equipment and the playback equipment. In this case, error rates can not be improved much, resulting in a failure in practical use.

SUMMARY OF THE INVENTION

The present invention relates to a recording format of record media suitable for automatic adjustment of an amplifier and an equalizer for both recording and playback, respectively, in order to realize interchangeable playback characteristics that are stable enough against the variations in performance between magnetic heads and also between record media, recording equipment used in preparing a record medium with the foregoing recording format and automatic adjustment equipment to make an automatic adjustment according to the foregoing data of recording format on the record medium.

The foregoing recording format for automatic adjustment is provided with at least one of the areas which are a data area of two kinds of sinusoidal wave, one with a reference wavelength for adjusting the amplification factor of an amplifier and the other with a short wavelength for adjusting the amount of equalization of an equalizer,a data area of adjustment data for detecting errors and also making an accurate adjustment of an equalizer, and a non-data area for a recording system adjustment. In addition, on part of each respective area of the above are provided an identification data to indicate that the particular medium is for an automatic adjustment and at the same time the kinds thereof and to show the types of the foregoing data areas, and also is provided time code.

The afore-mentioned recording equipment is a unit, whereby a reference record medium having the foregoing recording format for automatic adjustment is produced. The equipment comprises a means for generating sinusoidal waves of a reference wavelength and a short wavelength, an adjustment data generator, an identification data generator, a time code data generator and a recording means, which arranges the data from the foregoing plurality of data generating means according to the recording format as mentioned in the above to perform recording on a record medium under the most favorable recording conditions that suit to the magnetic characteristics of the record medium.

The foregoing automatic adjustment equipment is a recording/playback unit, which makes an automatic adjustment of an amplifier and an equalizer for playback and/or an amplifier and an equalizer for recording by utilizing the data of the foregoing recording format for automatic adjustment on the reference record medium as mentioned in the above. The equipment comprises a means for detecting identification data as recorded on the foregoing reference record medium and reproduced therefrom, a recording/playback amplifier with a variable amplification factor, a recording/playback equalizer with a variable amount of equalization, a means for generating adjustment data, a means for generating sinusoidal waves of a reference wavelength and a short wavelength, a means for detecting the amplitude of a reproduced signal, a means for measuring error rates and the like and additionally a system controller for controlling these means of the foregoing. First, an automatic adjustment program in the system controller is started according to an identification data recorded on the foregoing reference record medium by performing the reproduction thereof, thereby adjusting a playback amplifier and a playback equalizer, and then, in case where a recording system adjustment area exists on the reference record medium, adjusting the recording amplifier and recording equalizer according to the recording/playback of sinusoidal waves of the reference wavelength and nominal short wavelength and further accurately adjusting the recording equalizer according to the recording/playback of the adjustment data.

PREFERRED EXEMPLARY EMBODIMENTS OF THE INVENTION

Some of the preferred exemplary embodiments of the present invention will be explained below with reference to FIG. 1 to FIG. 6.

First, an explanation will be made on a recording format for automatic adjustment in a first exemplary embodiment of the present invention.

Figure 1:
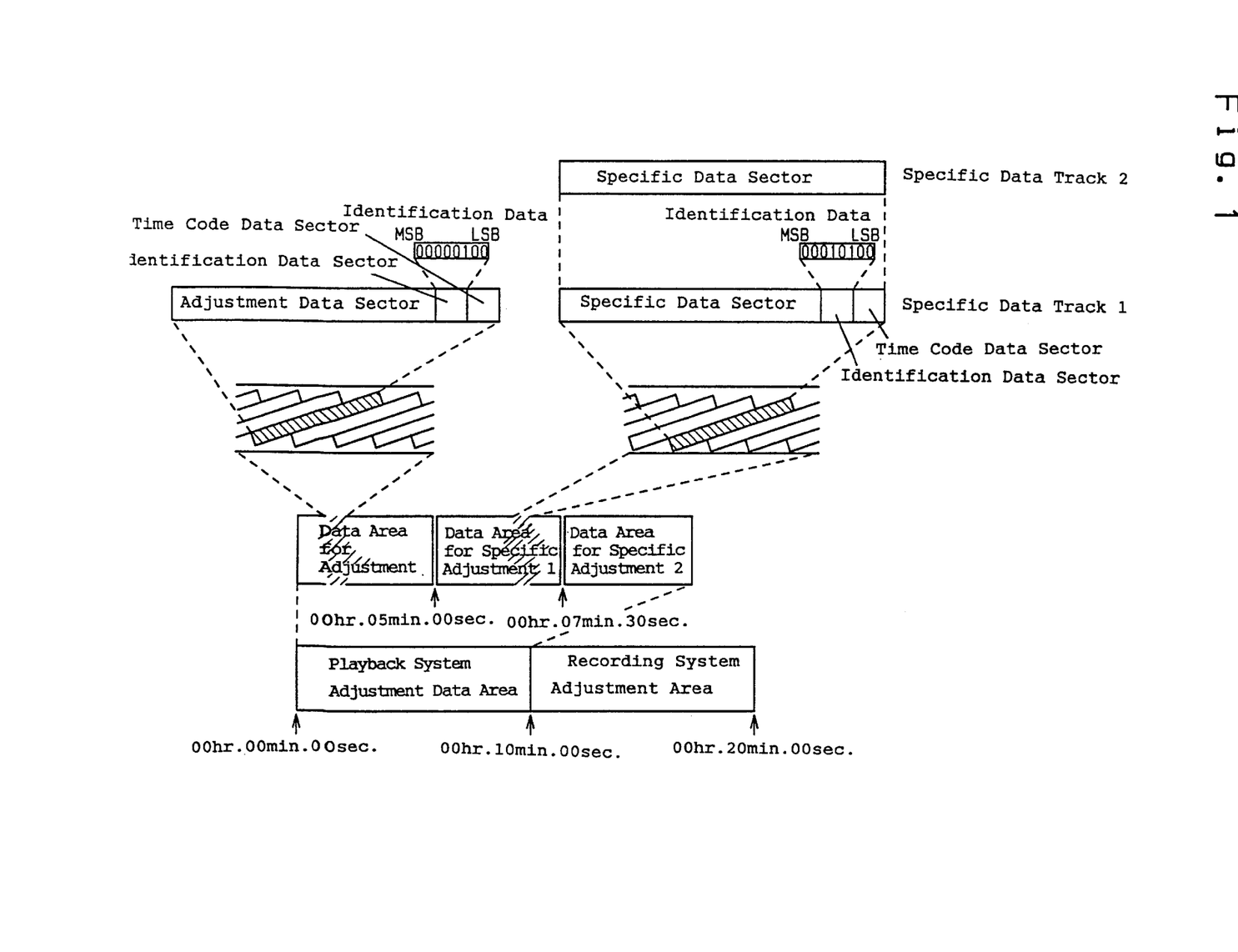
FIG. 1 shows a recording format for automatic adjustments in a first exemplary embodiment of the present invention, the recording format being helically recorded on a magnetic tape, possessing both the playback system adjustment data area including a data area for adjustment to make an accurate adjustment of a playback equalizer and perform an evaluation on the error rates and a data area for specific adjustment to make an adjustment of a playback amplifier and a playback equalizer ,and the recording system adjustment area for adjusting a recording amplifier and equalizer.

FIG. 1 shows the recording format for automatic adjustment on a magnetic tape for digital video in the first exemplary embodiment of the present invention. On a video data region helically recorded on a magnetic tape for digital video, there are a playback system adjustment data area that includes both of a data area for adjustment to make an accurate adjustment of a playback equalizer and perform an evaluation on the error rates and a data area for specific adjustment to adjust the amplification factor of a playback amplifier and the amount of equalization of the playback equalizer, and a recording system adjustment area for making an adjustment of a recording amplifier and a recording equalizer.

In the data area for adjustment of the playback system adjustment data area, time code, identification data and adjustment data are recorded on each respective track. Although any known digitized video signals can be used as the adjustment data, such TV test signals as the color bar signal and the like are usually used since it is easy to detect the generation of errors with the TV test signals. There are two areas in the data area for specific adjustment, and time code, identification data and one data selected from the sinusoidal wave data with a wavelength having a value near the shortest recording wavelength (referred to as "nominal short wavelength" hereafter) and the sinusoidal wave data with a reference wavelength (eight times the shortest recording wavelength, for example) are recorded on each respective track. In the recording system adjustment area, time code and identification data only are recorded on each respective track. The magnetic tape for automatic adjustment recorded according to the foregoing recording format for automatic adjustment is referred to as a reference magnetic tape hereafter.

Figure 2:
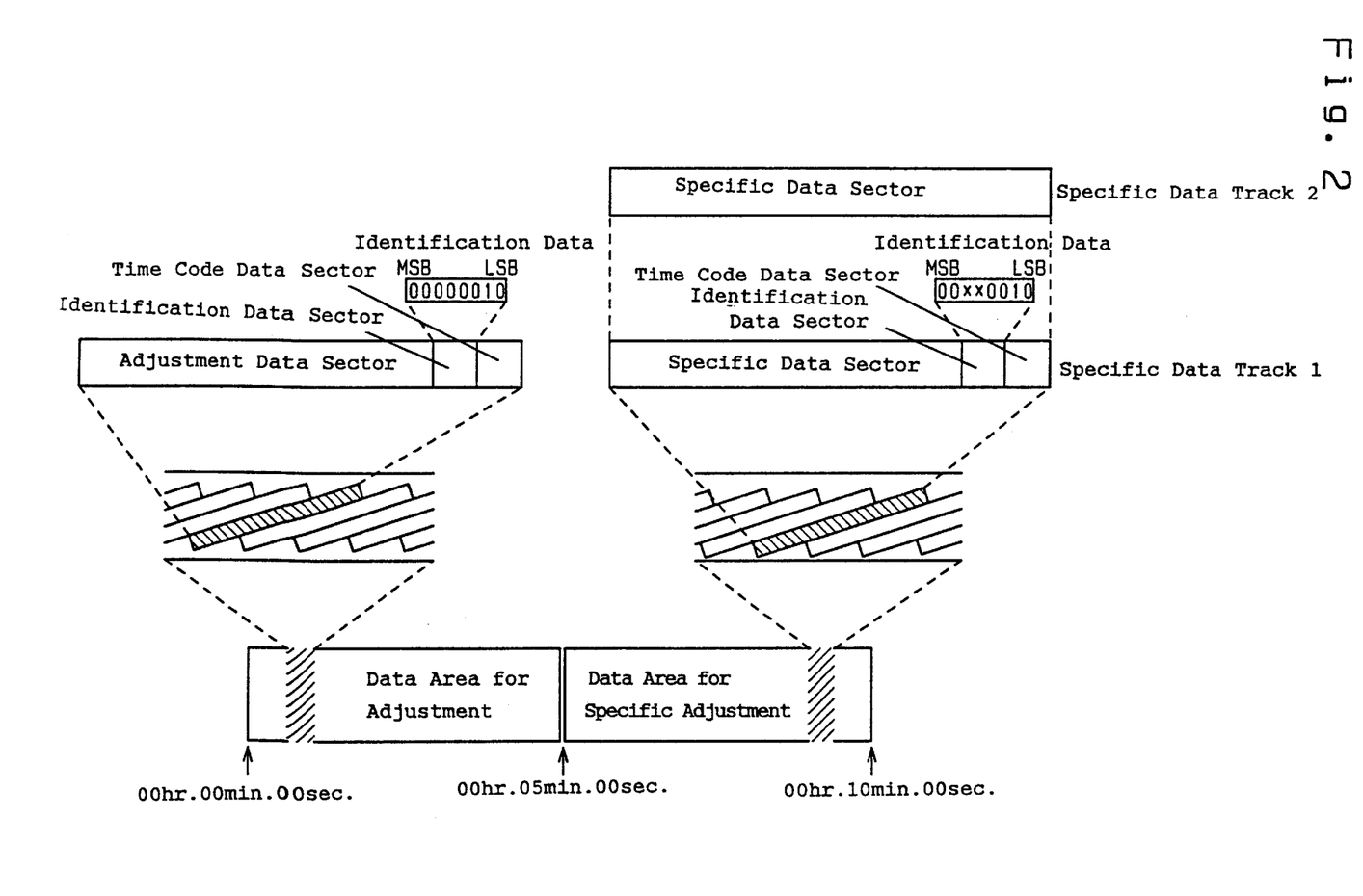
FIG. 2 shows a recording format for automatic adjustment in the first exemplary embodiment of the present invention, the recording format being helically recorded on a magnetic tape, including a data area for adjustment to make an accurate adjustment of a playback equalizer and perform an evaluation on the error rates and a data area for specific adjustment to make an adjustment of a playback amplifier and a playback equalizer.
Figure 3:
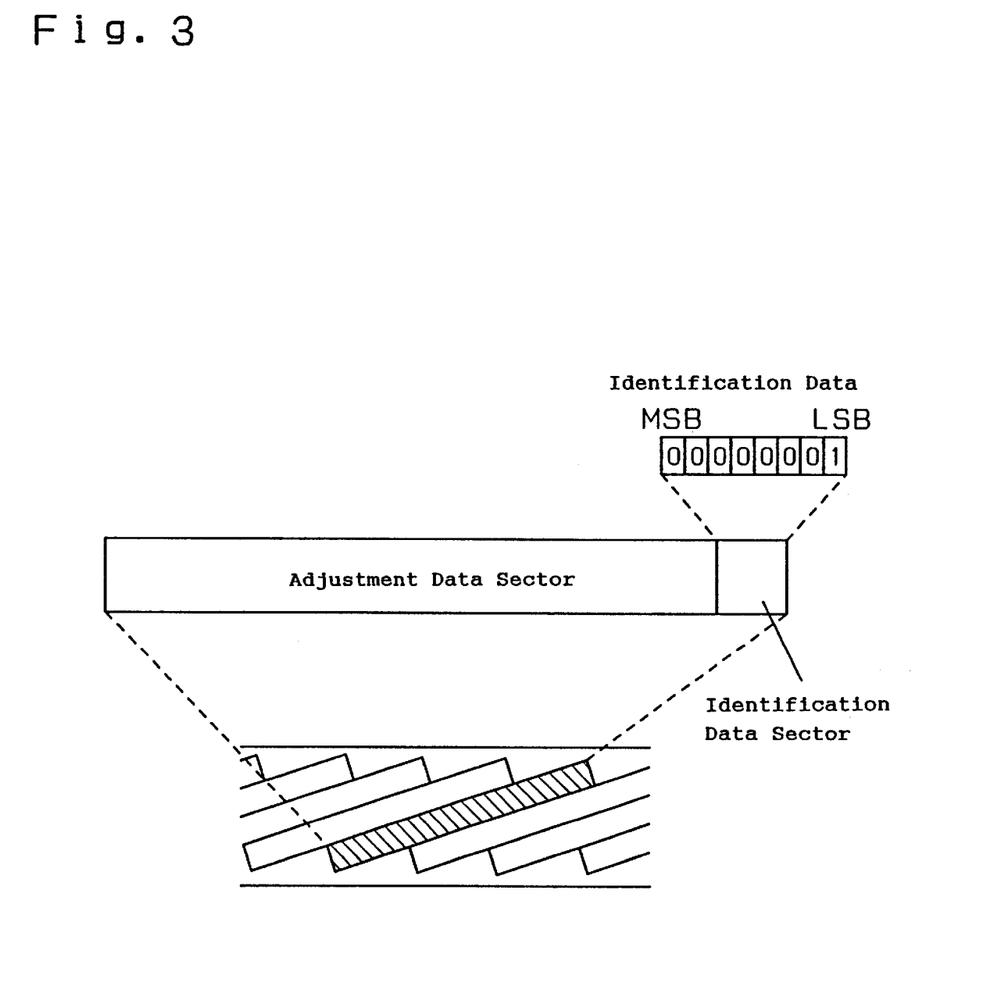
FIG. 3 shows a recording format for automatic adjustment in the first exemplary embodiment of the present invention, the recording format being helically recorded on a magnetic tape, including only a data area for adjustments to make an accurate adjustment of a playback equalizer and perform an evaluation on the error rates.

Although an appropriate gap (a slot in time) is needed between respective data, the gap is omitted in FIG. 1. The time code is code for setting up the starting time for a tape at 00 hours 00 minutes 00 seconds, and the identification data indicates that the magnetic tape is a reference magnetic tape for automatic adjustment and also indicates tape types and data's kinds for the areas. An example of the identification data is shown in Table 1. In this example, the first four bits (underlined in Table 1) out of the eight bit data of the identification data indicate a data area category of the reference magnetic tape and also indicate a recording wavelength category (which is different between the data area 1 for specific adjustment and the data area 2 for specific adjustment) in the data area for specific adjustment, and the last four bits indicate kinds of the reference magnetic tape. The recording format in FIG. 1 as explained before corresponds to (3) of the contents of reference magnetic tape in Table 1. The recording format prepared by omitting the recording system adjustment area from the recording format of FIG. 1 is shown in FIG. 2 and corresponds to (2) of the contents of reference magnetic tape of Table 1. Further, the recording format prepared by omitting the data area for specific adjustment is shown in FIG. 3 and corresponds to (1) of the contents of reference magnetic tape of Table 1. What follows in the explanation below mainly deals with FIG. 1, namely the reference magnetic tape (3) in Table 1.

TABLE 1

An Example of Identification Data
(XXXX differs by data area.)

| Contents of Reference Magnetic Tape | Kinds of Reference Magnetic Tape | Data Area for Adjustment | Data Area for Specific Adjustment | | Recording System Adjustment Area |
|---|---|---|---|---|---|
| | | | 1 (Ref. Wavelength) | 2 (Nom. Wavelength) | |
| (1) Adjustment | XXXX 0001 | 0000 0001 | | | |
| (2) (1)+ Specific Adjustment | XXXX 0010 | 0000 0010 | 0001 0010 | 0010 0010 | |
| (3) (2)+ Recording System Adjustment | XXXX 0100 | 0000 0100 | 0001 0100 | 0010 0100 | 0100 0100 |

Table 2 shows an example listing of recording time, identification data and recording data for adjustment.

TABLE 2

An Example of Reference Magnetic
Tape for Automatic Adjustment

| Name of Data Area | | Start Time Min. Sec. | End Time Min. Sec. | Identification Data | Recording Data for Adjustment |
|---|---|---|---|---|---|
| Play back System Adjustment | For Adjustm't | 00 04 | 00 59 | 0000 0100 | TV Test Signal |
| | For Specific Adjustm't 1 | 05 07 00 29 | | 0001 0100 | Ref. Wave Length Sinusoidal Wave |
| | For Specific Adjustm't 2 | 07 09 30 59 | | 0010 0100 | Nominal Short Wave Length Sinusoidal Wave |
| Recording System Adjustment | | 10 19 00 59 | | 0100 0100 | None |

Next, an explanation will be made on recording equipment for producing a reference magnetic tape of the foregoing recording format for automatic adjustment in a second exemplary embodiment of the present invention.

Figure 4:
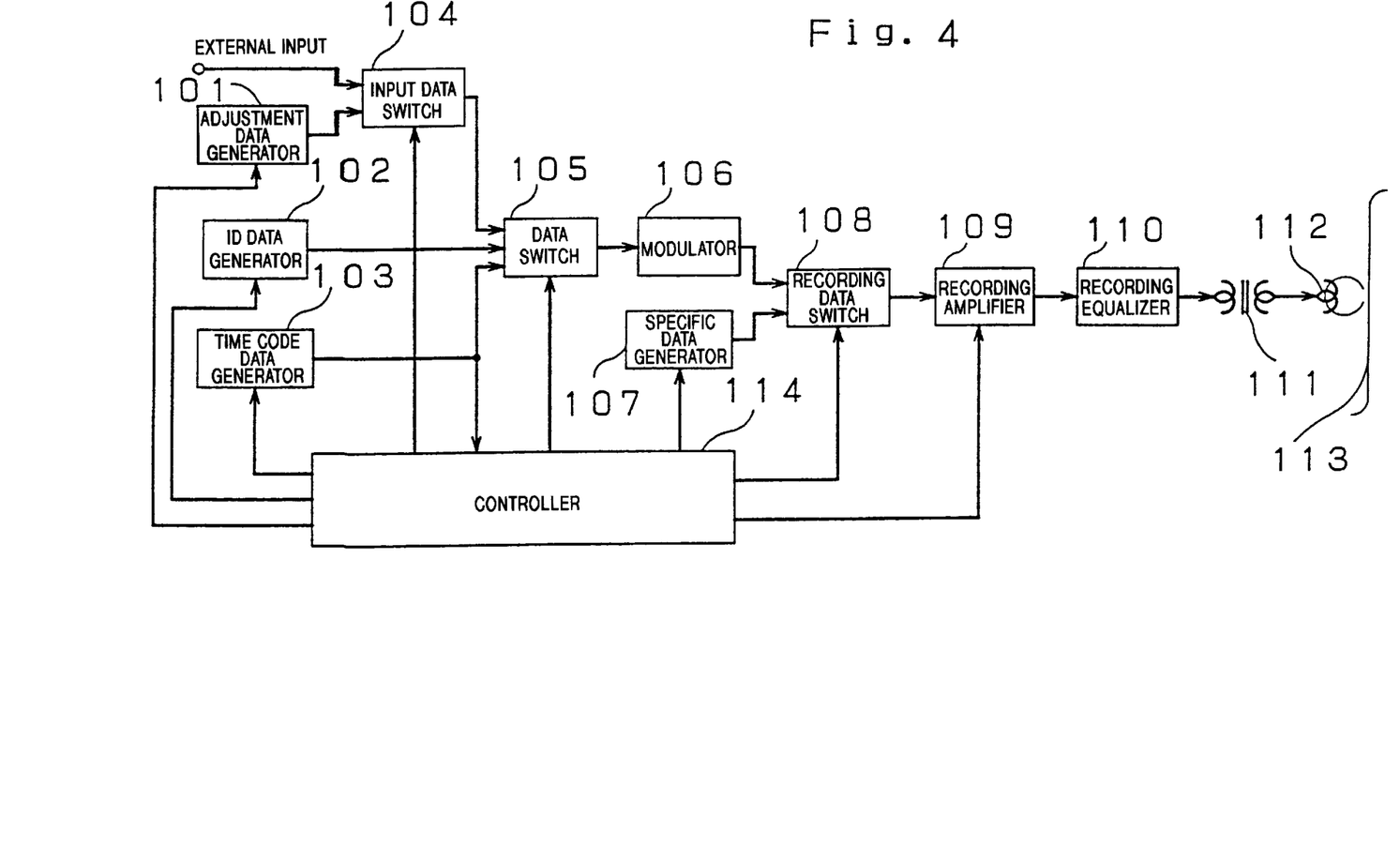
FIG. 4 is a block diagram of recording equipment for use in producing a reference magnetic tape of a recording format for automatic adjustment in a second exemplary embodiment of the present invention.

FIG. 4 is a block diagram of recording equipment used in producing a reference magnetic tape for automatic adjustment that has a recording format for automatic adjustment. An adjustment data generator 101 produces adjustment data by digitizing TV test signals such as a color bar signal and multi-burst signal. An identification data generator 102 produces identification data that differ by kinds of reference magnetic tape for automatic adjustment and adjustment data areas. A time code data generator 103 produces time code data that indicate an absolute time with the start time set to 00 hours 00 minutes 00 seconds. An input data switch 104 gives an output signal by switching between recording data from an external source and adjustment data from the adjustment data generator 101. A data switch 105 gives an output signal by switching between recording data from the input data switch 104, identification data from the identification data generator 102 and time code data from the time code data generator 103 according to the recording format. A modulator 106 modulates recording data from the data switch 105 by a scrambled NRZ method to match an electromagnetic conversion system. A specific data generator 107 produces a sinusoidal wave signal with the shortest recording wavelength or a nominal short wavelength near the shortest recording wavelength for adjusting an equalizer and a sinusoidal wave signal with a reference wavelength (usually eight times the shortest recording wavelength) for adjusting the amplification factor of an amplifier. A recording data switch 108 gives an output signal by switching between recording data from the modulator 106 and a sinusoidal wave signal from the specific data generator 107. This signal is fed to a rotary transformer 111 through a recording amplifier 109 and a recording equalizer 110. The rotary transformer 111 transmits a recording signal from the recording equalizer 110 to a record head 112 via circuits located on a rotary cylinder. The record head 112 converts the recording signal from the rotary transformer 111 to magnetic fluxes for recording on a magnetic tape 113. A controller 114 puts out adjustment data of the adjustment data generator 101 by making a selection of kinds of adjustment data, controls identification data from the identification data generator 102, controls time code data of the time code generator 103, controls the input data switch 104, controls switching timing of the data switch 105, controls the frequencies of sinusoidal wave signals of the specific data generator 107, controls switching timing of the recording data switch 108 and sets up the amplification factor of the recording amplifier 109 and the amount of equalization of the recording equalizer 110.

Next, how to prepare a reference magnetic tape of the recording format for automatic adjustment by using the recording equipment of FIG. 4 will be explained with reference to FIG. 1, Table 1 and Table 2.

First, a tape to serve as the prime constituent of the magnetic tape 113 having magnetic characteristics such as coercive force, residual magnetic flux density and the like and dropout that are considered the norm of that kind of tape is selected and assembled to complete the magnetic tape 113. The amplification factor of the recording amplifier 109 and the amount of equalization of the recording equalizer 110 are set to the values that are determined in advance according to the standard characteristics of the kind of the tape selected in such a way that the SN ratio becomes largest and the nonlinear distortion of recording becomes smallest when data are recorded and played back. Then, pursuant to the start time and end time of Table 2, the controller 114 controls the input data switch 104, data switch 105 and recording data switch 108 according to the time code data of the time code data generator 103, and at the same time controls production of identification data from the identification data generator 102 and recording wavelength of the specific data generator 107, thereby recording data on the magnetic tape 113 as per Table 2 and producing a reference magnetic tape of the recording format for automatic adjustment as shown in FIG. 1.

Figure 5:
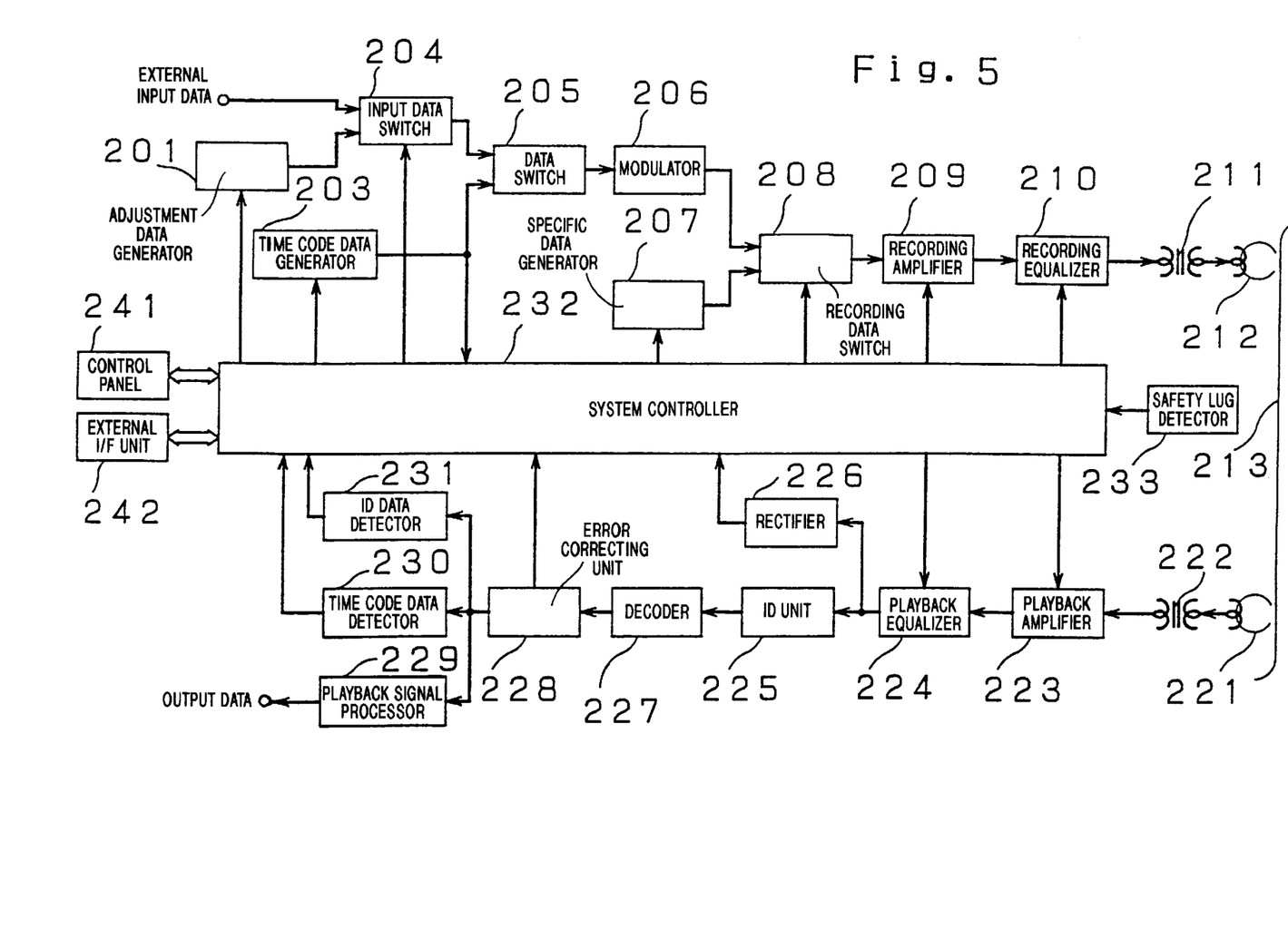
FIG. 5 is a block diagram of automatic adjustment equipment in a third exemplary embodiment of the present invention.

An explanation will be made next on automatic adjustment equipment that utilizes the foregoing data of recording format as carried on the reference magnetic tape for automatic adjustment in a third exemplary embodiment of the present invention. FIG. 5 shows a block diagram of the foregoing automatic adjustment equipment. An adjustment data generator 201 produces adjustment data that are digitized versions of TV test signals such as color bar signal and multi-burst signal. An input data switch 204 gives an output signal by switching between recording data received from outside and adjustment data from an adjustment data generator 101. A time code data generator 203 produces time code data that indicate absolute time. A data switch 205 gives an output signal by switching between recording data from the input data switch 204 and time code data of the time code data generator 203 according to according format. A modulator 206 modulates recording data from the data switch 205 to match the electro-magnetic system by the use of a scrambled NRZ method. A specific data generator 207 produces sinusoidal wave signals having a nominal short wavelength, which is close to the shortest recording wavelength, for adjusting the amount of equalization of equalizer and a reference wavelength (usually eight times the shortest recording wavelength) for adjusting the amplification factor of amplifier. A recording data switch 208 gives an output signal by switching between recording data from the modulator 206 and sinusoidal wave signals from the specific data generator 207.

This signal is fed to a rotary transformer 211 through a recording amplifier 209 and a recording equalizer 210. The rotary transformer 211 transmits recording signals from the recording equalizer 210 to a record head 212 via circuits located on the rotary cylinder. The record head 212 records recording signals from the rotary transformer 211 on the magnetic tape 213 after converting the recording signals to magnetic fluxes. A playback head 221 reproduces signals from the magnetic tape 213. Another rotary transformer 222 transmits reproduced signals from the playback head 221 to a playback amplifier 223. The playback amplifier 223 amplifies the reproduced signals transmitted from the rotary transformer 222 and a playback equalizer 224 makes a correction of the amount of equalization of the reproduced signals and feeds the signals to an identifying unit 225 and a rectifier 226. The identifying unit 225 quantizes and identifies the reproduced signals from the playback equalizer 224. The rectifier 226 rectifies envelope of the reproduced signals from the playback equalizer 224. A decoder 227 decodes the reproduced data from the identifying unit 225 according to an algorithm that is the reverse of modulation algorithm of the modulator 206.

An error correcting unit 228 detects and corrects the errors in the reproduced data from the decoder 227, and also measures error rates of the reproduced data.

A playback signal processor 229 makes format conversions of the reproduced data from the error correcting unit 228 to give the reproduced data to outside and makes an adjustment of output timing. A time code data detector 230 detects time code data from the reproduced data out of the error correcting unit 228. An identification data detector 231 detects identification data from the reproduced data out of the error correcting unit 228. A system controller 232 selects adjustment data of the adjustment data generator 201, selects input data of the input data switch 204, controls time code data of the time code data generator 203, selects wavelengths in sinusoidal wave signals of the specific data generator 207 and controls switching timing of the recording data switch 208 from the time code data of the time code data generator 203.

Figure 6:
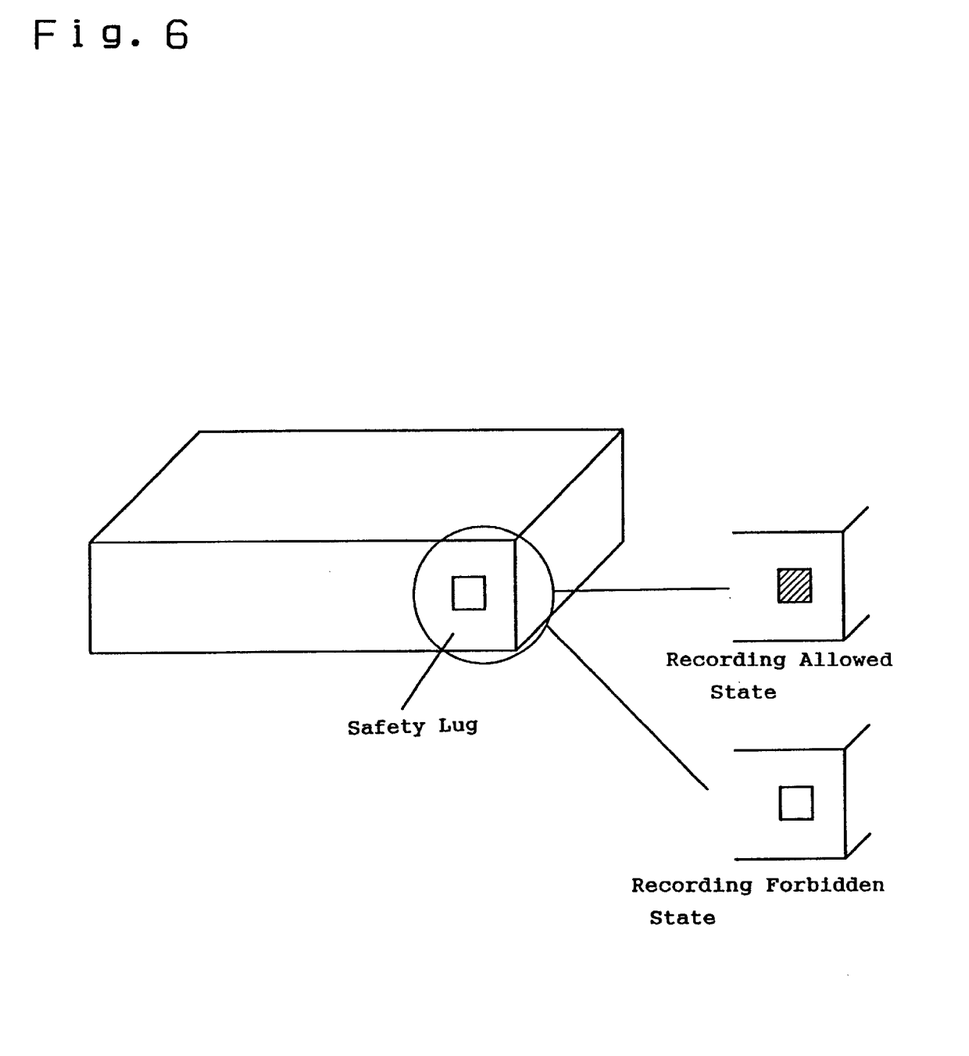
FIG. 6 is a perspective view to show a safety lug provided on a case, which encases a magnetic tape for use with the automatic adjustment equipment in the third exemplary embodiment of the present invention.

Further, the system controller 232 starts an automatic adjustment program according to the identification data from the identification data detector 231 for adjusting automatically the amplification factor of the recording amplifier 209, the amount of equalization of the recording equalizer 210, the amplification factor of the playback amplifier 223 and the amount of equalization of the playback equalizer 224 to optimum conditions. A safety lug detector 233 detects a safety lug attached to a case that houses the magnetic tape 213 for protection. A control panel 241 has buttons for activating recording, playback and automatic adjustment functions, respectively, and when any buttons are pressed down, activation of corresponding functions is notified to the system controller 232. An external interface unit 242 performs processing for communication between external control units such as a computer and the like and the system controller 232. FIG. 6 is a perspective view of a safety lug provided on a case that houses the magnetic tape for protection.

An explanation will be made on how the automatic adjustment equipment in an exemplary embodiment of the present invention, which is structured as described in the above, works with reference to FIG. 1, Table 1 and Table 2. When a reference magnetic tape having a recording format prepared according to FIG. 1, namely Table 2, is set as the magnetic tape 213 with automatic adjustment equipment in an exemplary embodiment of the present invention and played back from the beginning, an identification data "0000 0100" is detected from the playback data by the identification data detector 231 and fed to the system controller 232. The system controller 232 identifies this magnetic tape 213 as being the reference magnetic tape for adjustment, which has three areas including a adjustment data area for accurately adjusting the playback equalizer and evaluating error rates, a specific adjustment data area for adjusting the amplification factor of the playback amplifier and the amount of equalization of the playback equalizer, and a recording system adjustment area for adjusting the amplification factor of the recording amplifier and the amount of equalization of the recording equalizer, and starts an automatic adjustment program for adjusting all of the above to optimum conditions.

First, the system controller 232 illuminates an automatic adjustment execution button (not shown in the drawing) of the control panel 241 in order to confirm the execution of automatic adjustment. When this automatic adjustment execution button is pushed down, the system controller 232 confirms this state and starts an automatic adjustment. If the automatic adjustment execution button remains not pushed down for a given period, the automatic adjustment does not take place, thereby terminating the operation. Otherwise, the system controller 232 starts adjustments of the amplification factor of the playback amplifier 223 and the amount of equalization of the playback equalizer 224. Until the identification data "0001 0100" is detected by the identification data detector 231 or the time code data "00 hours 05 minutes 00 seconds" is read by the time code data detector 230, the position of the magnetic tape 213 is advanced and then the magnetic tape 213 is reproduced. As shown in FIG. 1 and in Table 2, during the period of the identification data "0001 0100", namely from "00 hours 05 minutes 00 seconds" to "00 hours 07 minutes 29 seconds" in terms of the time code data, a sinusoidal wave signal of a reference wavelength amounting to eight times the shortest recording wavelength is recorded in the data sector for specific adjustment. The system controller 232 controls the amplification factor of the playback amplifier 223 to make the rectifying level of the rectifier 226 equal to a rectifying level A that has been set up in advance to optimize the input level of playback signal to the playback equalizer 224.

Then, the system controller 232 advances the position of the magnetic tape 213 until the identification data "0010

0100" is detected by the identification data detector 231 or the time code data "00 hours 07 minutes 30 seconds" is read from the time code data detector 230 and then the magnetic tape 213 is reproduced. As shown in FIG. 1 and in Table 2, during the period of the identification data "0010 0100", namely from "00 hours 07 minutes 30 seconds" to "00 hours 09 minutes 59 seconds" in terms of the time code data, a sinusoidal wave signal of a nominal short wavelength near the shortest recording wavelength has been recorded in the data sector for specific adjustment. The system controller 232 adjusts the amount of equalization of the playback equalizer 224 to make the rectifying level of the rectifier 226 equal to a nominal level that has been set up in advance at around —6 dB against the rectifying level A, thereby enabling the adjustment of the playback equalizer 224 to minimize the interference between codes at quantized threshold levels.

Further, the system controller 232 returns the position of the magnetic tape 213 until the identification data "0000 0100" is detected by the identification data detector 231 or the time code data "00 hours 00 minutes 00 seconds" is read from the time code data detector 230 and then the magnetic tape 213 is reproduced, thus precisely readjusting the amount of equalization of the playback equalizer 124 in order to minimize the error rates of the adjustment data from the error rate correcting unit 228. Accordingly, the playback amplifier 223 and playback equalizer 224 are adjusted so as to match the recording characteristics of data area for playback system adjustment on the reference magnetic tape for automatic adjustment as shown in FIG. 1.

In addition, the system controller 232 starts to make an adjustment of the amplification factor of the recording amplifier 209 and the amount of equalization of the recording equalizer 210. The system controller 232 advances the position of the magnetic tape 213 until the identification data "0100 0100" is detected by the identification data detector 231 or the time code data "00 hours 10 minutes 00 seconds" is read by the time code data detector 230, and time code data of the time code data generator 203 is preset to "00 hours 10 minutes 00 seconds" and then starts recording after controlled to produce a sinusoidal wave signal with a reference wavelength of about eight times the shortest recording wavelength from the specific data generator 207 and selecting the foregoing signal at the recording data switch 208. At this time, since the magnetic tape 213 is a reference magnetic tape for adjustment, the safety lug on the case housing the magnetic tape 213 for protection as shown in FIG. 6 is arranged to a state where recording is not possible.

The system controller 232 finds out that no recording is possible to be made on the magnetic tape 213 through the safety lug detector 233. However, since the recording adjustment area for making an adjustment of the recording amplifier and recording equalizer is identified by the identification data from the identification data detector 231 or the time code data from the time code data detecter 230, recording is started at a specified position.

The system controller 232 controls the amplification factor of the recording amplifier 208 so as to have a sinusoidal wave signal of a reference wavelength of about eight times the shortset recording wavelength recorded/ played back simultaneously on the magnetic tape 213 and to make the rectifying level of the rectifier 226 equal to the rectifying level A, thereby making the recording level on the magnetic tape 213 coincide with the recording level of the data area for playback system adjustment as shown in FIG. 1.

The system controller 232 then controls the specific data generator 207 so as to produce a sinusoidal wave signal of the nominal short wavelength near the shortest recording wavelength and perform simultaneous recording/playback on the magnetic tape 213, thereby adjusting the amount of equalization of the recording equalizer 210 so as to make the rectifying level of the rectifier 226 equal to the nominal level. Thus, the recording system characteristics are made almost to equal to the recording characteristics of the data area for playback system adjustment on the reference magnetic tape 213 for adjustment as shown in FIG. 1.

In the next place, the system controller 232 rearranges adjustment data from the adjustment data generator 201 obtained via the input data switch 204 and time code data from the time code data generator 203 in the data switch 205 according to a recording format, performs modulation in the modulator 206, makes selecttions in the recording data switch 208, performs simultaneous recording/playback on the magnetic tape 213 and makes a precise readjustment of the amount of equalization of the recording equalizer 210 so as to minimize the error rates of the error correcting unit 228.

Accordingly, the recording amplifier 209 and recording equalizer 210 are adjusted so as to show the same recording characteristics as the ones realized when data are recorded in the data area for playback system adjustment on the magnetic tape 213. When this adjustment is finished, the system controller 232 rewinds the tape after erasing the recording data in the recording adjustment area of the magnetic tape 213 when the erasing is needed and ejects the tape, thus bringing the operation of automatic adjustment of an end.

The foregoing description has been made with an assumption that the equipment performs simultaneous recording/ playback in the recording system adjustment, but when such a function is not available the same adjustment can be performed by repeating recording and playing back alternately.

As described in the above, the recording/playback characteristics of automatic adjustment equipment are automatically adjusted to match the magnetic characteristics of a reference magnetic tape for automatic adjustment, thereby realizing excellent interchangeability among the tapes of the same kind.

In addition, when formats of FIG. 2 [corresponding to (1) of Table 1] or FIG. 3 [corresponding to (2) of Table 1], in which part of the recording area is omitted, are used by the reference magnetic tape for automatic adjustment, corresponding part of the foregoing adjustment steps is selected and executed by the use of the data recorded on the reference magnetic tape according to the identification data or time code. In this case, interchangeability in playback is realized.

Instead of pushing down the button as described in the above to confirm the execution of automatic adjustment, the same effect can be achieved by an external controller (not shown in the drawing) via the external interface unit 242. Also, the automatic adjustment program for effecting the foregoing operation can be stored in an external controller and identification data from the identification data detector 231 are transmitted through the external interface unit 242 to start the automatic adjustment program stored in the external controller, thereby making an automatic adjustment of the foregoing automatic adjustment equipment via the external interface unit 242.

In case where a recording format does not have an identification data and a time code selector like the specific data track 2 in FIG. 1 to FIG. 3, a playback position of the magnetic tape 213 can be located by using a control signal for servo lock or by counting track numbers.

It is also made possible readily in practice to make automatic adjustments by the use of automatic adjustment equipment more flexible by adding to the recording format a group of data including wavelengths or frequencies of both the reference wavelength and nominal short wavelength and a specified rectifying levels at each respective wavelength, and by recording the resulting recording format on the reference record medium for automatic adjustment by utilizing the foregoing added group of data.

Although all the descriptions made in the above relate to magnetic tapes for digital video, these descriptions are applicable to the entire magnetic recording/playback equipment including magnetic disc players and the applications thereof. Furthermore, these are also applicable to all sorts of recording/playback equipment employing a system of interchangeable record media.

Usability in the Industry

Only by playing a reference record medium of a recording format for automatic adjustment on automatic adjustment equipment that performs recording/playback, an automatic adjustment program satisfying an adjustment objective is started with recorded identification data, and adjustments of a playback amplifier, playback equalizer, recording amplifier and recording equalizer to optimum conditions to match the recording characteristics of the reference record medium are made possible, thereby making it possible to shorten the time required to make adjustments and at the same time to achieve an advantageous effect of realizing excellent interchangeability overcoming variations in head characteristics, changes in head characteristics due to wear and variations in characteristics of record media.

Furthermore, although the shortest recording wavelength is usually set up to have some leeway by taking into consideration the variations in head characteristics, changes in head characteristics due to wear, kinds of record media and variations in characteristics of media, use of the automatic adjustment equipment of the present invention allows the shortest recording wavelength to be made shorter, thereby also making higher density recording possible.

What is claimed is:

1. A recording format for automatic adjustment comprising: at least one of the areas which are (a) two recording areas of sinusoidal waves of a reference wavelength for making an adjustment of a playback amplifier and a short wavelength for making an adjustment of a playback equalizer of the equipment, whereby a signal is recorded on and/or reproduced from a record medium, (b) a recording area of adjustment data for detecting errors and making an accurate adjustment of the playback equalizer, and (c) a non-data area for recording system adjustment; and further comprising in part of said areas, identification data with a data section to indicate the medium is for automatic adjustment and a data section to indicate kinds of the medium.

2. The recording format for automatic adjustment according to claim 1, wherein a data section to indicate kinds of said areas is added to the identification data.

3. The recording format for automatic adjustment according to claim 1, wherein time code section is added to part of said areas.

4. Recording equipment to record the recording format for automatic adjustment prepared according to claim 1, comprising:

a means for producing sinusoidal waves of a reference wavelength and/or a short wavelength;

a means for producing adjustment data;

a means for producing identification data; and a means for recording the data from said plurality of means for producing data according to an arrangement provided by said recording format to record to optimum recording conditions in accordance with the characteristics of record media.

5. Automatic adjustment equipment for performing an automatic adjustment by the use of data of the recording format for automatic adjustment prepared according to claim 1 and recorded on a record medium, comprising:

a recording means for recording data on a record medium;

a playback means for reproducing a signal from a record medium;

an identification data detecting means for detecting identification data from playback data on a record medium;

a safety lug detecting means for detecting record forbidding bits on a record medium; and a system controlling means for starting an automatic adjustment program and making an adjustment of said recording means and said playback means according to the results of detection from said identification data detecting means.

6. The automatic adjustment equipment according to claim 5, which is provided with a time code data detecting means for detecting time code in playback data and transmitting the results of detection to the system controlling means.

7. The automatic adjustment equipment according to claim 6, wherein the system controlling means can positively unprotect a record medium according to the results of detection from the identification data detecting means.

8. The automatic adjustment equipment according to claim 5, wherein the system controlling means can positively unprotect a record medium according to the results of detection from the identification data detecting means.

* * * * *